(12) United States Patent
Katada et al.

(10) Patent No.: US 7,562,947 B2
(45) Date of Patent: Jul. 21, 2009

(54) APPARATUS FOR CONTROLLING DRIVING FORCE OF VEHICLE

(75) Inventors: Kunio Katada, Tochigi (JP); Masatoshi Noguchi, Tochigi (JP); Masao Teraoka, Tochigi (JP)

(73) Assignee: GKN Driveline Torque Technology KK, Tochigi-Shi, Tochigi-Ken (JP)

(*) Notice: Subject to any disclaimer, the term of this patent is extended or adjusted under 35 U.S.C. 154(b) by 333 days.

(21) Appl. No.: 11/297,525

(22) Filed: Dec. 7, 2005

(65) Prior Publication Data
US 2006/0124374 A1 Jun. 15, 2006

(30) Foreign Application Priority Data
Dec. 10, 2004 (JP) ............................. 2004-358497
Feb. 21, 2005 (JP) ............................. 2005-044756

(51) Int. Cl.
*B60T 8/00* (2006.01)
(52) U.S. Cl. ...................... 303/140; 180/197; 180/248; 701/83; 701/88

(58) Field of Classification Search ................. 303/139, 303/140; 180/197, 247, 248; 701/83, 88
See application file for complete search history.

(56) References Cited

U.S. PATENT DOCUMENTS 6,219,609 B1 * 4/2001 Matsuno et al. ............... 701/72
6,564,140 B2 * 5/2003 Ichikawa et al. ............... 701/91

FOREIGN PATENT DOCUMENTS

JP 10-217932 8/1998

* cited by examiner

*Primary Examiner*—Kevin Hurley
(74) *Attorney, Agent, or Firm*—Jordan and Hamburg LLP

(57) ABSTRACT

An apparatus for controlling the driving force of a vehicle is capable of using brakes to limit a differential operation, securing sufficient torque, and suppressing the heating and wearing of the brakes. In the vehicle, an engine generates torque to drive front wheels and/or rear wheels. A front differential allows differential rotation between the front wheels and transmits torque of the engine to the front wheels. A rear differential allows differential rotation between the rear wheels and transmits torque of the engine to the rear wheels. Disk brakes separately brake the front and rear wheels. An ABS/attitude electric control unit controls the disk brakes to limit differential rotation between the front wheels or between the rear wheels. At least one of the front and rear differentials is provided with a differential limiting mechanism.

5 Claims, 16 Drawing Sheets

Fig.7A
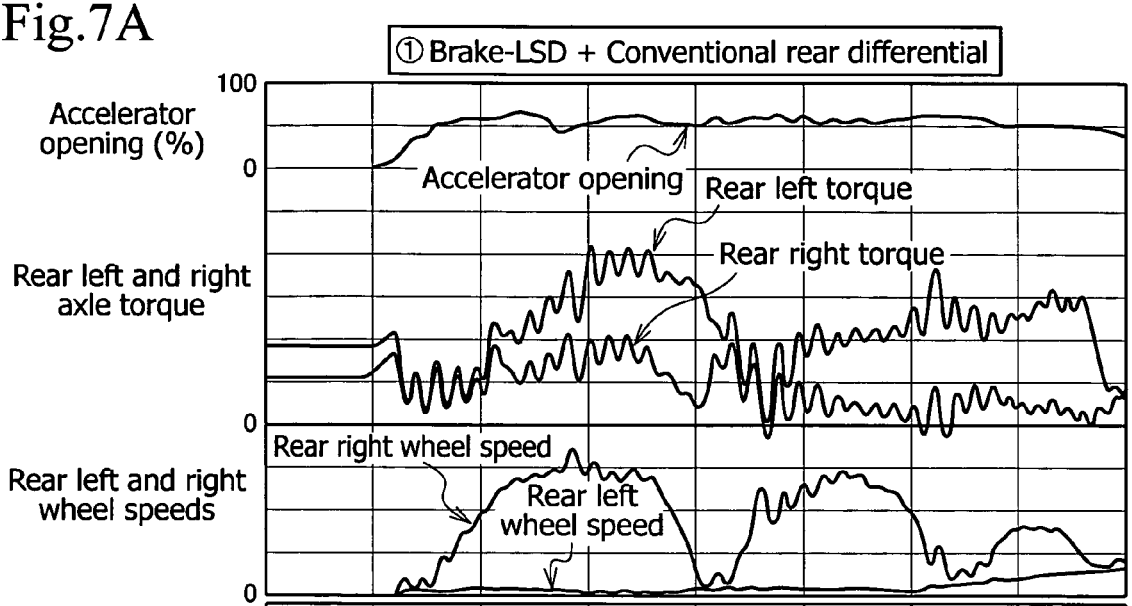
Fig.7B
Fig.7C
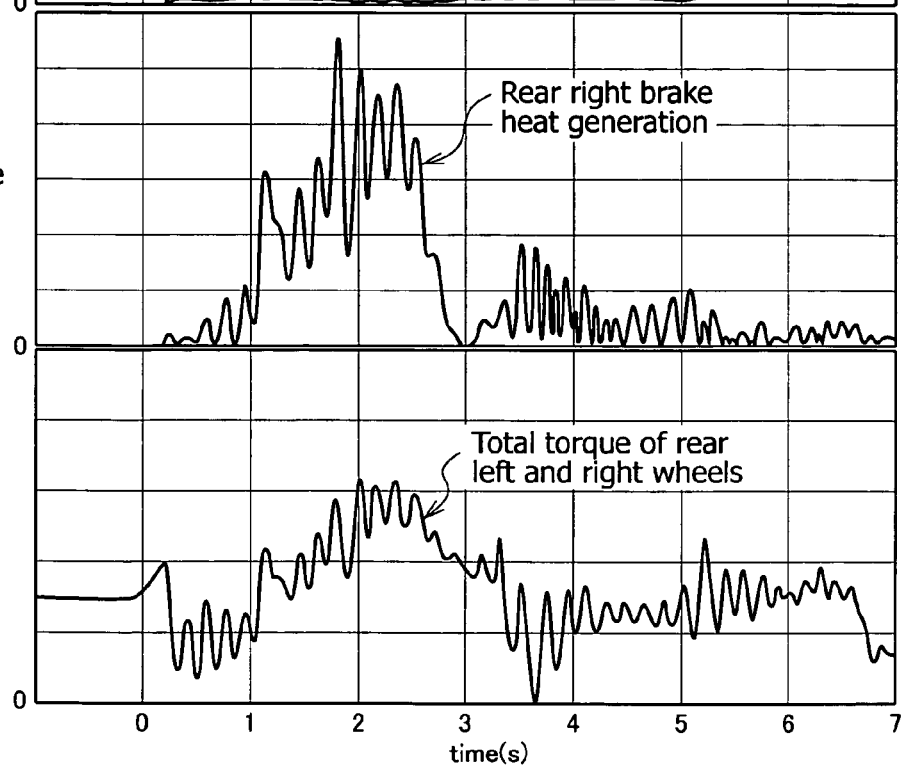

US 7,562,947 B2

APPARATUS FOR CONTROLLING DRIVING FORCE OF VEHICLE

BACKGROUND OF THE INVENTION

1. Field of the Invention

The present invention relates to an apparatus for controlling the driving force of a vehicle.

2. Description of Related Art

A vehicle generally employs a differential mechanism to transfer driving force from an engine to left and right drive wheels and smoothly turn a corner. In the case of a four-wheel-drive vehicle, a center differential mechanism is frequently employed. If one of the drive wheels spins without traction, the differential mechanism transmits torque from the engine to the spinning drive wheel. If this happens, the vehicle will be unable to escape from this state.

To prevent this, the differential mechanism is usually provided with a differential limiting mechanism. If one of the drive wheels loses traction, the differential limiting mechanism limits differential rotation of the differential mechanism, to help the vehicle smoothly escape from such a state.

Japanese Unexamined Patent Application Publication No. 10-217932 discloses an apparatus for controlling driving force of a vehicle. This apparatus utilizes a brake of each drive wheel, to decrease torque on the drive wheel if the drive wheel is spinning without traction, thereby escaping from the one wheel spinning state. Without employing the differential limiting mechanism, this apparatus can limit the operation of a differential mechanism.

This apparatus employs a speed sensor for each of first and second drive wheels including first and second drive wheels. If the apparatus detects from the speed sensors that a limit driving force on the first drive wheel is smaller than that on the second drive wheel, the apparatus brakes the first drive wheel, thereby increasing an apparent driving force on the first drive wheel and increasing an actual driving force on the second drive wheel. Without employing the differential limiting mechanism, this apparatus can help the vehicle come out of the drive wheel spinning state.

This apparatus, however, uses the brake against torque from the engine. Accordingly, the torque is consumed as thermal energy, to reduce driving force and wear the brake. This apparatus, therefore, is impractical.

SUMMARY OF THE INVENTION

An object of the present invention is to provide an apparatus for controlling the driving force of a vehicle, capable of limiting a differential operation with brakes while maintaining sufficient driving torque and suppressing the heating and wearing of the brakes.

In order to accomplish the object, an aspect of the present invention provides an apparatus for controlling the driving force of a vehicle, having a brake provided for each drive wheel, a brake controller controlling at least one of the brakes to limit differential rotation between the drive wheels, a differential mechanism, and a differential limiting mechanism provided for the differential mechanism.

If one of the drive wheels spins without traction to cause differential rotation between the drive wheels, the brake controller conducts to brake the spinning drive wheel. As a result, torque which is transmitted to the other drive wheel that is not spinning is increased, according to a torque bias ratio set for the differential limiting mechanism. Namely, the drive wheel that is not spinning can receive sufficient torque. This results in reducing workload of the brake operating on the spinning drive wheel, thereby suppressing the heating and wearing of the brake.

BRIEF DESCRIPTION OF THE DRAWINGS

FIGS. 4A, 4B, and 4C are graphs showing results of a driving force control test carried out on a secondary drive side of an on-demand-type four-wheel-drive vehicle which is provided with the driving force control apparatus of the first embodiment, in which FIG. 4A shows temporal changes in the accelerator opening, rear left and right axle torque, and rear left and right wheel speeds of the vehicle, FIG. 4B shows temporal changes in the heat generation of a rear brake, and FIG. 4C shows temporal changes in the total torque of rear left and right wheels;

FIGS. 5A, 5B, and 5C are graphs showing results of a driving force control test carried out on a secondary drive side of an on-demand-type four-wheel-drive vehicle according to a comparative example, in which FIG. 5A shows temporal changes in the accelerator opening, rear left and right axle torque, and rear left and right wheel speeds of the vehicle, FIG. 5B shows temporal changes in the heat generation of a rear brake, and FIG. 5C shows temporal changes in the total torque of rear left and right wheels;

FIGS. 6A, 6B, and 6C are graphs showing results of a driving force control test carried out on a primary drive side of a four-wheel-drive vehicle which is provided with the driving force control apparatus of the first embodiment, in which FIG. 6A shows temporal changes in the accelerator opening, rear left and right axle torque, and rear left and right wheel speeds of the vehicle, FIG. 6B shows temporal changes in the heat generation of a rear brake, and FIG. 6C shows temporal changes in the total torque of rear left and right wheels;

FIGS. 7A, 7B, and 7C are graphs showing results of a driving force control test carried out on a primary drive side of a four-wheel-drive vehicle according to a comparative example, in which FIG. 7A shows temporal changes in the accelerator opening, rear left and right axle torque, and rear left and right wheel speeds of the vehicle, FIG. 7B shows temporal changes in the heat generation of a rear brake, and FIG. 7C shows temporal changes in the total torque of rear left and right wheels;

DETAILED DESCRIPTION OF EMBODIMENTS

Driving force control apparatuses according to embodiments of the present invention will be explained with reference to the drawings. Each embodiment activates a brake to limit a differential operation while securing sufficient driving torque and suppressing the heating and wearing of the brake by employing a simple structure.

First Embodiment

[Four-Wheel-Drive Vehicle]

Figure 1:
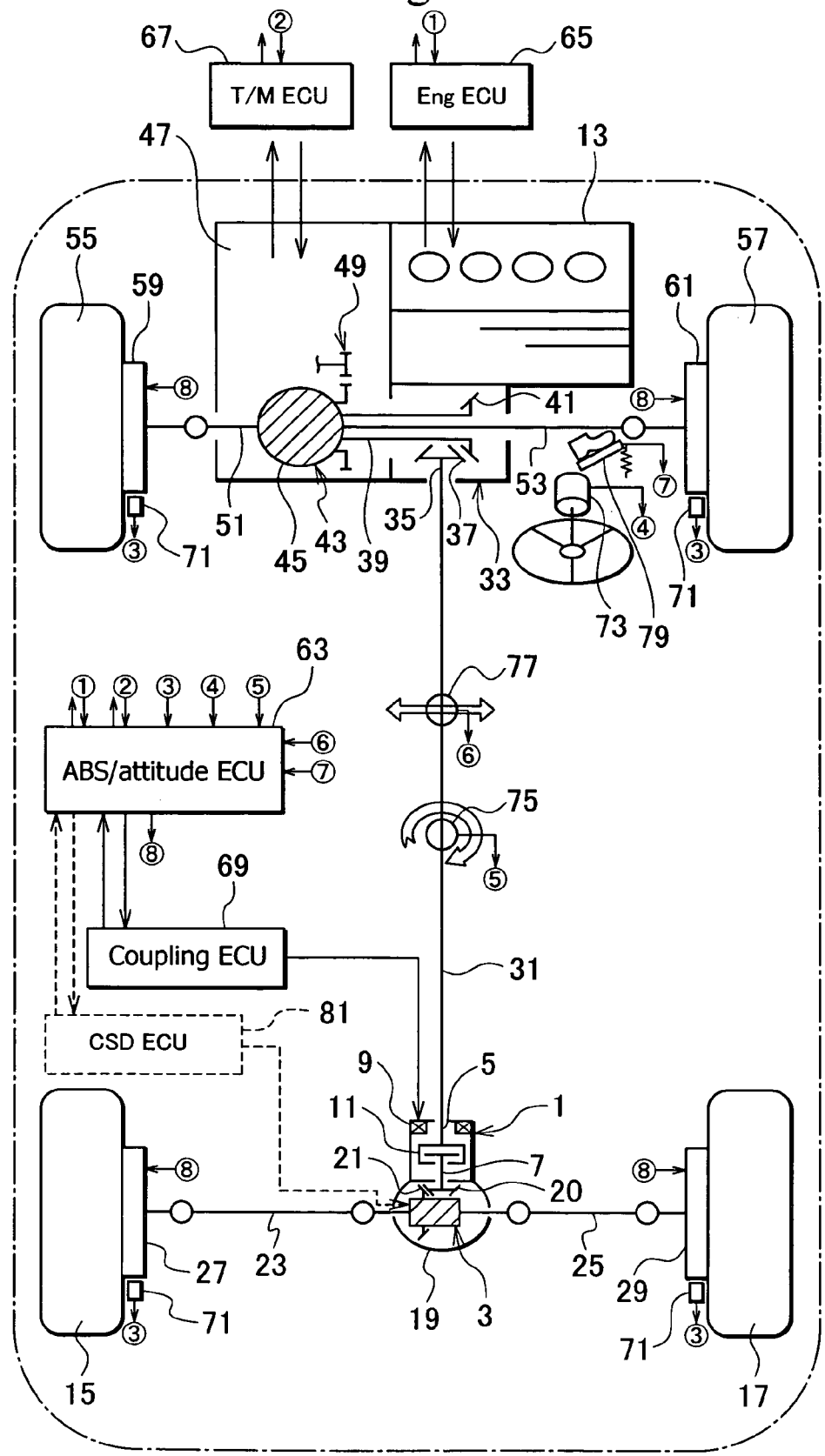
FIG. 1 is a plan view generally showing a four-wheel-drive vehicle having a driving force control apparatus according to a first embodiment of the present invention.

FIG. 1 is a plan view generally showing a four-wheel-drive vehicle having a driving force control apparatus according to the first embodiment of the present invention. This vehicle is a front-engine, front-drive vehicle, i.e., an FF vehicle.

In FIG. 1, a torque transmission coupling 1 serving as a torque connection/disconnection mechanism is arranged on the input side of a rear differential 3. The torque transmission coupling 1 is placed between a rotary shaft 5 and a drive pinion shaft 7, to operate the vehicle as an on-demand-type four-wheel-drive vehicle.

The torque transmission coupling 1 is of an active type and has an electromagnet 9 serving as an actuator. With magnetic force of the electromagnet 9, the torque transmission coupling 1 controls engaging force on a multiplate clutch 11, to thereby control torque transmission from the rotary shaft 5 to the drive pinion shaft 7. The multiplate clutch 11 includes, for example, a main clutch and a pilot clutch. The pilot clutch is engaged with the magnetic force of the electromagnet 9, to activate a cam mechanism. The cam mechanism operates a pusher that engages the main clutch.

The torque transmission coupling 1 has a target transmission torque, which is set so that the torque transmission coupling 1 may not slip due to input from the rear differential 3 when the rear differential 3 achieves a brake LSD function (to be explained later). The target transmission torque of the torque transmission coupling 1 is set to be greater than a transmission torque that is transmitted to rear wheels, i.e., secondary drive wheels when front wheels, i.e., primary drive wheels spin without traction at the start of the vehicle.

To engage the multiplate clutch, the torque transmission coupling 1 may have a hydraulic piston, or a combination of an electric motor and a cam.

The torque transmission coupling 1 may be a passive-type coupling that transmits torque from front side to rear side according to a difference between the rotation speeds of the front and rear wheels. The passive-type coupling may be a viscous coupling employing a viscous fluid, a coupling employing an oil pump to engage a multiplate clutch, or a rotary blade coupling. If the torque transmission coupling 1 is a passive-type coupling, a target transmission torque for the same is set like that for the active-type coupling.

The rear differential 3 is arranged between an internal combustion engine 13 and rear left and right wheels 15 and 17 on the secondary drive side. The rear differential 3 is rotatably supported with a differential carrier 19. The rear differential 3 allows a differential rotation between the rear left and right wheels 15 and 17 and transmits torque of the engine 13 to the rear wheels 15 and 17.

The rear differential 3 receives torque from the torque transmission coupling 1 through a drive pinion gear 20 and a ring gear 21. The drive pinion gear 20 is arranged on the drive pinion shaft 7 serving as a final reduction gear. The ring gear 21 is arranged in the rear differential 3.

The rear differential 3 has a differential limiting mechanism that makes the rear differential 3 function as a passive-type LSD (limited-slip differential). It is preferable for the rear differential 3 to equalize a differential limit torque on the rear right wheel to that on the rear left wheel. For this, the differential limiting mechanism is provided with a torque bias ratio (TBR) Rt or a transfer ratio in the range of 2.3 to 4.0. According to the first embodiment, the rear differential 3 is a torque sensitive differential, and the transfer ratio is set as Rt=3.0.

The passive-type LSD may be the torque sensitive LSD, or a differential rotation sensitive LSD that consists of a passive-type torque transmission coupling mentioned above and a differential gear mechanism including a set of gears. If the rear differential 3 employs a cone clutch or a multiplate clutch to be engaged with reaction produced by meshing bevel gears, the torque bias ratio Rt may be set in the range of 1.7 to 2.4.

Output of the rear differential 3 is connected to the rear left and right wheels 15 and 17 through left and right axle shafts 23 and 25.

The rear wheels 15 and 17 are provided with disk brakes 27 and 29, respectively. The disk brakes 27 and 29 separately and individually brake the rear wheels 15 and 17.

The rotary shaft 5 is connected through a universal joint to a propeller shaft 31. The propeller shaft 31 is connected through a universal joint to an output shaft 35 of a transfer 33.

The output shaft 35 has a bevel gear 37 meshing with a bevel gear 41 of a hollow transmission shaft 39. The hollow transmission shaft 39 is integral and interlocked with a differential case 45 of a front differential 43. The front differential 43 may have the same structure as the rear differential 3 and may have a torque bias ratio Rt of 3.0.

The front differential 43 receives torque of the engine 13 through a transmission 47 and a reduction gear 49. The front differential 43 is connected through left and right axle shafts 51 and 53 to front left and right wheels 55 and 57 that are primary drive wheels.

The front wheels 55 and 57 have disk brakes 59 and 61, respectively. The disk brakes 59 and 61 separately and individually brake the front wheels 55 and 57.

Torque of the engine 13 is transmitted through the transmission 47 to the front differential 43. The torque is then transmitted through the axle shafts 51 and 53 to the front left and right wheels 55 and 57. At the same time, the torque is transmitted through the differential case 45, hollow transmission shaft 39, and bevel gears 41 and 37 to the output shaft 35.

From the output shaft 35, the torque is transmitted through the propeller shaft 31 and rotary shaft 5 to the torque transmission coupling 1.

If the torque transmission coupling 1 is in a torque transmission state, the torque is transmitted through the drive pinion shaft 7 to the rear differential 3. From the rear differential 3, the torque is transmitted through the left and right axle shafts 23 and 25 to the rear left and right wheels 15 and 17.

When the torque transmission coupling 1 is in the torque transmission state, the vehicle runs in a four-wheel driving state in which the front wheels 55 and 57 and rear wheels 15 and 17 are driven. If the torque transmission coupling 1 is not in the torque transmission state, the vehicle runs in a two-wheel driving state in which the front wheels 55 and 57 are driven.

[Rear Differential]

Figure 2:
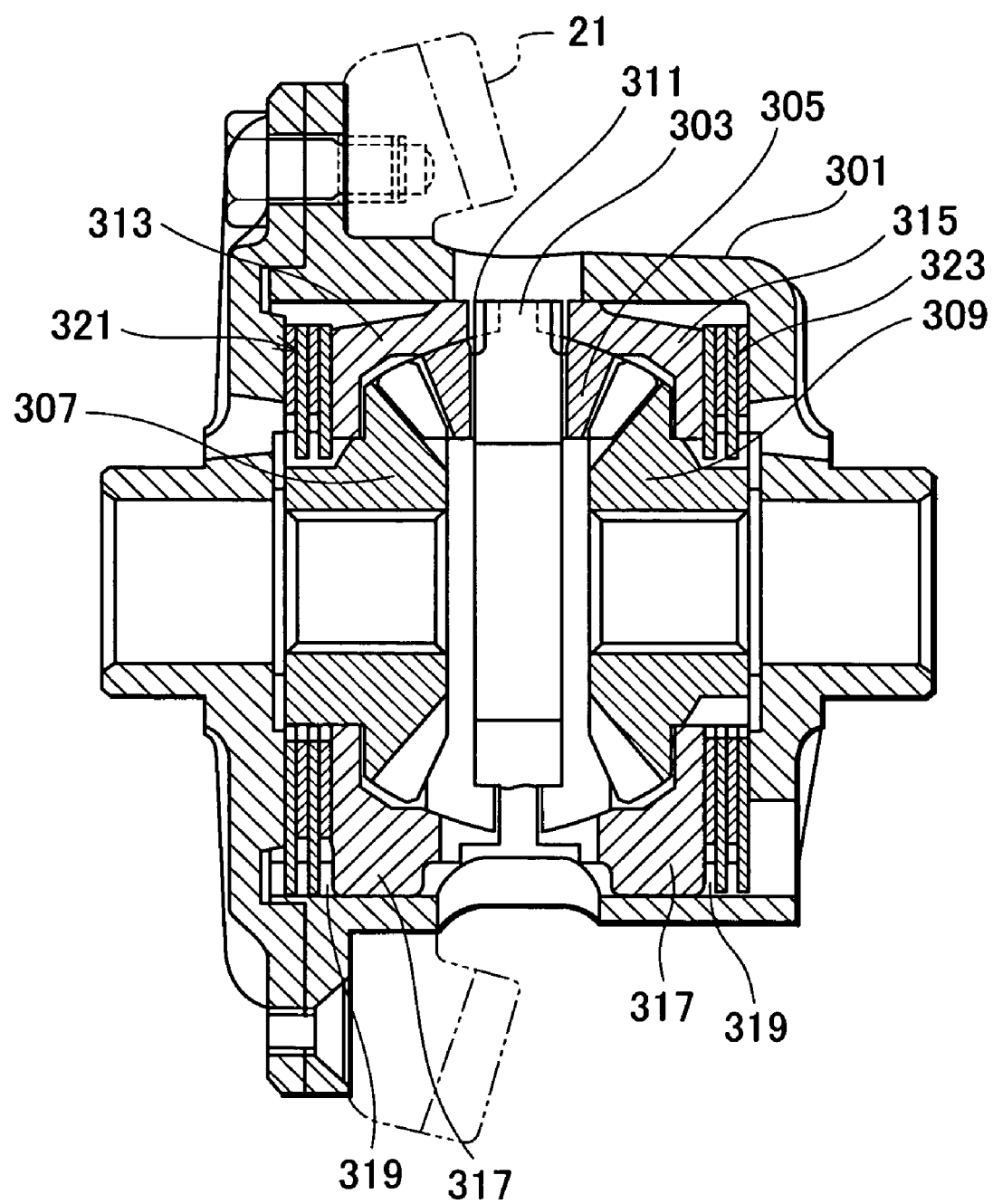
FIG. 2 is a sectional view showing a rear differential installed in the vehicle of FIG. 1.

FIG. 2 is a sectional view showing the rear differential 3. The rear differential 3 has a differential case 301 to which the ring gear 21 is attached. The differential case 301 accommodates a pinion shaft 303, a pinion gear 305 supported with the pinion shaft 303, and left and right side gears 307 and 309 meshing with the pinion gear 305. The side gears 307 and 309 are connected to the left and right axle shafts 23 and 25, respectively.

The pinion shaft 303 engages through a V-cam 311 with left and right pressure rings 313 and 315. The pressure rings 313 and 315 each have a projection 317 on the periphery thereof. The projection 317 engages with a round groove 319 that is formed in an inner face of the differential case 301. Accordingly, the pressure rings 313 and 315 are rotatable and axially movable.

Between the left and right pressure rings 313 and 315 and the differential case 301, there are frictional multiplate clutches 321 and 323. Plates of the clutches 321 and 323 engage with the round groove 319 of the differential case 301, and disks of the clutches 321 and 323 engage with the side gears 307 and 309.

The V-cam 311, which is between the pinion shaft 303 and the pressure rings 313 and 315, the pressure rings 313 and 315, and the clutches 321 and 323 form the differential limiting mechanism of the rear differential 3. The torque bias ratio of the differential limiting mechanism can be properly set by selecting the numbers of the plates of the clutches 321 and 323, or an angle of the V-cam 311, or both of them. According to the first embodiment, the torque bias ratio is set as Rt=3.0.

Torque transmitted from the ring gear 21 to the differential case 301 is transmitted through the pressure rings 313 and 315 to the pinion shaft 303. The pinion shaft 303 transfers a driving force to the V-cam 311. Depending on the cam angle of the V-cam 311, the driving force generates a component force. The component force widens the left and right pressure rings 313 and 315 and pushes them to the differential case 301 side.

As a result, the clutches 321 and 323 engage to transfer the torque.

If a difference occurs between the rotation speeds of the left and right wheels due to corner turning or spinning, a driving force on a wheel that is on an inner side in the turning direction or that is opposite to the spinning wheel is increased. If the vehicle is turning to the left, or if the right wheel is spinning without traction, the disks of the right clutch 323 engaging with the right side gear 309 tend to rotate faster than the plates, and therefore, are dragged and braked by the plates. On the other hand, the disks of the left clutch 321 engaging with the left side gear 307 tend to rotate slower than the plates, and therefore, are pulled and driven by the plates.

Consequently, torque on the right wheel is reduced by the transmission torque of the clutch 323, and torque on the left wheel is increased by the same quantity. Namely, when the vehicle turns a corner, larger torque is transmitted to a wheel on an inner side in the turning direction. When a wheel spins without traction, torque is transmitted from the spinning wheel to the wheel opposite to the spinning wheel.

The limited-slip differential (LSD) may be realized not only with the structure employing the bevel gears and multi-plate clutches but also with a structure employing parallel meshing gears using gear reaction and gear friction, a structure employing worm gears, a structure employing pieces and cam face friction, and a structure employing bevel gears and friction that is caused by gear reaction and occurs between a differential case and gears or members rotating together with the gears.

[Brakes]

The disk brakes 27 and 29 for the rear wheels 15 and 17 are of, for example, a hydraulic type. Each of the disk brakes has a disk rotor rotating with the rear wheel, a pair of friction pads, and an actuator. The actuator actuates a hydraulic brake cylinder that presses the friction pads from each side of the disk rotor. The disk brakes may be of an electric type employing a thrust generating mechanism including an electric motor and gears.

The disk brakes 59 and 61 for the front wheels 55 and 57 are the same as the rear disk brakes 27 and 29. Namely, the front disk brakes 59 and 61 are of a hydraulic type and each include a disk rotor rotating with the front wheel, a pair of friction pads, and an actuator. The actuator actuates a hydraulic brake cylinder that presses the friction pads from each side of the disk rotor.

A brake system for operating the disk brakes 27, 29, 59, and 61 will be explained roughly. A brake pedal is linked through a booster with a master cylinder. The master cylinder includes two pressure chambers that are independent of each other and are arranged in series or tandem. When the brake pedal is pressed, a corresponding hydraulic pressure is mechanically generated in each pressure chamber. The master cylinder is connected through passages to the brake cylinders of the disk brakes 27, 29, 59, and 61. In the middle of the passages, a hydraulic pressure control mechanism is arranged to separately control the brake cylinders.

The hydraulic pressure control mechanism can switch a plurality of control states from one to another for each brake cylinder. The control states include at least a pressure increased state to connect a given brake cylinder to the master cylinder and a pressure decreased state to connect the brake cylinder to a reservoir. According to the first embodiment, the hydraulic pressure control mechanism has a solenoid. The solenoid generates magnetic force, and depending on the magnetic force, the hydraulic pressure control mechanism selects the pressure increased state, or the pressure decreased state, or a sustaining state to disconnect the brake cylinder from the master cylinder and reservoir. In a control released state, the hydraulic pressure control mechanism is in the pressure increased state to make each brake cylinder generate a hydraulic pressure corresponding to a braking operation. In a controlled state, the hydraulic pressure control mechanism is switched to one of the pressure decreased state, sustaining state, and pressure increased state, to increase/decrease the hydraulic pressure of a given brake cylinder.

The hydraulic pressure control mechanism includes, for each brake cylinder, a 3-position valve to be switched to one of the pressure increased state, pressure decreased state, and sustaining state, or a combination of a 2-position valve to be switched between the pressure increased state and sustaining state and a 2-position valve to be switched between the pressure decreased state and sustaining state. Instead, the hydraulic pressure control mechanism may have a housing and a piston that is air-tightly slidable in the housing. The housing and piston form a pressure control chamber. The piston is driven by a source that converts electric energy into mechanical energy, to control a hydraulic pressure in the pressure control chamber. The controlled hydraulic pressure is transferred to each brake cylinder. In this case, the source may be a motor, a piezoelectric element, or the like.

[Driving Force Controller]

The four-wheel-drive vehicle mentioned above has a driving force controller. The driving force controller includes an ABS (antilock brake system)/attitude ECU (electric control unit) 63, an engine ECU 65, a transmission ECU 67, and a coupling ECU 69. The ECUs 63, 65, 67, and 69 communicate with one another through a CAN (community area network).

The ABS/attitude ECU 63 controls the hydraulic pressure control mechanism for the disk brakes 27, 29, 59, and 61 according to a brake pedal operation, so that the front and rear wheels 55, 57, 15, and 17 may be braked without being locked even if it rains. If an attitude control switch is ON, the ABS/attitude ECU 63 controls the hydraulic pressure control mechanism for the disk brakes 27, 29, 59, and 61, to control the dynamic attitude such as a yaw rate of the vehicle according to signals related to the dynamic attitude of the vehicle.

The ABS/attitude ECU 63 receives a control signal for the engine ECU 65, a control signal for the transmission ECU 67, a signal detected by a speed sensor 71, a signal detected by a steering angle sensor 73, a signal detected by a lateral G sensor 75, a signal detected by a yaw sensor 77, a signal detected by an accelerator sensor 79, and a control signal for the coupling ECU 69.

The engine ECU 65 controls the number of revolutions of the engine according to signals such as a signal detected by the accelerator sensor 79. The engine ECU 65 receives data from the ABS/attitude ECU 63.

The transmission ECU 67 controls the position of the transmission 47 according to a shift lever operation. The transmission ECU 67 receives data from the ABS/attitude ECU 63.

The coupling ECU 69 controls to energize the electromagnet 9 of the torque transmission coupling 1 according to a switch operation and the like. The coupling ECU 69 receives data from the ABS/attitude ECU 63.

[Brake LSD]

The ABS/attitude ECU 63 is capable of achieving a brake LSD function by controlling the hydraulic pressure control mechanism for the disk brakes 27, 29, 59, and 61.

There are several vehicle attitude stabilizing techniques to stabilize the attitude of a running vehicle. The techniques include VDC (vehicle dynamic control; registered trademark), VSC (vehicle stability control; registered trademark), and the brake LSD. These techniques stabilize the attitude of a running vehicle by collectively controlling the engine, transmissions, driving clutches, and brakes of the vehicle with the use of a plurality of ECUs according to data provided by a plurality of sensors.

Apart from the attitude stabilizing control, the brake LSD function may be used to limit a differential operation solely, to improve the driving ability of a vehicle when the vehicle starts at a low speed, climbs a slope, or runs over a rough road. This type of brake LSD function is achievable with a brake ECU solely.

If the rear right wheel 17 spins to differently rotate relative to the rear left wheel 15, torque of the engine 13 is transmitted through the torque transmission coupling 1 to the rear right wheel 17, to thereby further spin the rear right wheel 17 and decrease torque on the rear left wheel 15. To prevent this, the brake LSD function activates the rear right disk brake 29, to limit a differential rotation between the rear left and right wheels 15 and 17. Consequently, torque of the engine 13 is transmitted through the torque transmission coupling 1 to the rear left wheel 15, to increase torque on the rear left wheel 15.

According to the first embodiment, the torque bias ratio (TBR) of the rear differential 3 is set as Rt=3.0. According to this torque bias ratio, torque on the rear left wheel 15 is increased, to thereby obtain a sufficient driving force. Due to the increased torque on the rear left wheel 15, the braking time of the rear right disk brake 29 is shortened, to suppress the heating and wearing of the disk brake 29.

Figure 3:
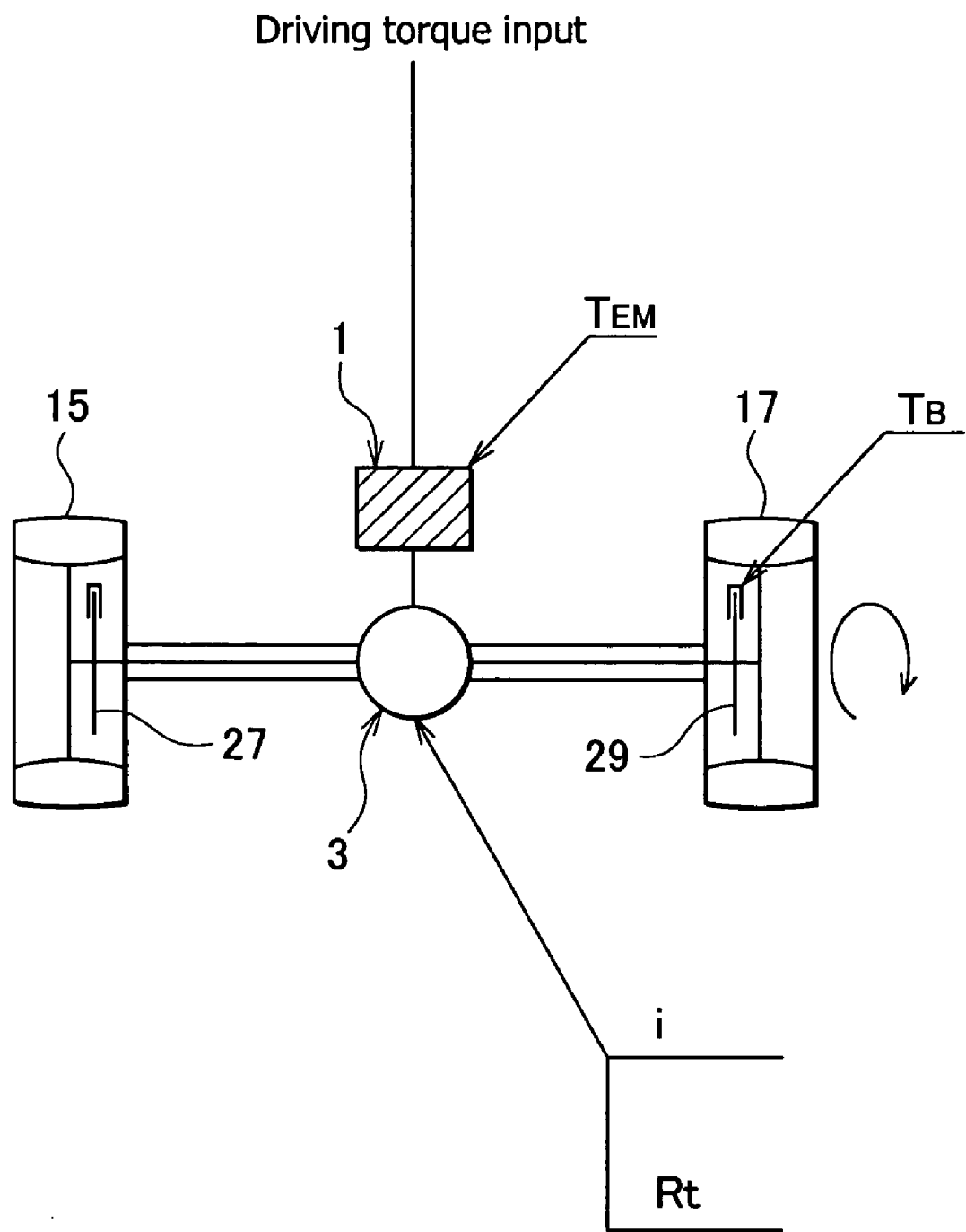
FIG. 3 is a plan view partly showing the vehicle of FIG. 1.

FIG. 3 shows reference marks related to coupling torque and braking torque.

In FIG. 3, "i" is a final reduction ratio between the torque transmission coupling 1 and the rear differential 3 (i.e., between the drive pinion 20 and the ring gear 21), "Rt" is the torque bias ratio of the rear differential 3, "TB" is the braking torque of the disk brake 29, and "TEM" is the transmission torque of the torque transmission coupling 1.

The ABS/attitude ECU 63 controls the disk brake 29 as follows:

$$TB \leq TEM \cdot i/(Rt+1)$$

This control can prevent from increasing the braking torque in excess, also minimize the braking torque, and suppress the heating and wearing of the disk brake 29.

According to the first embodiment, the rear differential 3 is on the secondary drive side of the four-wheel-drive vehicle. Increasing the torque bias ratio of the rear differential 3 results in increasing a torque increment by the brake LSD function. When this function is not required, the torque transmission coupling 1 is disabled. This results in preventing judder noise to be produced in a low-speed corner turn from the rear differential 3 even with a high torque bias ratio.

The brake LSD function works on each of the rear left and right wheels 15 and 17 if one of the wheels spins without traction. According to the first embodiment, the front differential 43 on the primary drive side is also provided with the differential limiting mechanism, so that the brake LSD function may effectively work with the disk brakes 59 and 61 on the front wheels 55 and 57.

[Test Results]

FIGS. 4A to 9 show results of driving force control tests, in which FIGS. 4A to 4C, 6A to 6C, and 8 relate to the present invention and FIGS. 5A to 5C, 7A to 7C, and 9 relate to comparative examples. FIGS. 4A to 5C, 8, and 9 relate to results of tests carried out on the secondary drive sides of on-demand-type four-wheel-drive vehicles, and FIGS. 6A to 7C relate to results of tests carried out on the primary drive sides of four-wheel-drive vehicles. In each of the tests related to FIGS. 4A to 4C and 8, the brake LSD function was achieved according to the present invention, to conduct vehicle attitude stabilizing control on the rear wheel side serving as a secondary drive side. In the test related to FIG. 6A to 6C, the brake LSD function was achieved according to the present invention, to conduct vehicle attitude stabilizing control on the rear wheel side serving as a primary drive side. In each of the comparative examples of FIGS. 5A to 5C and 9, the brake LSD function was achieved to conduct vehicle attitude stabilizing control on the rear wheel side serving as a secondary drive side, the secondary drive side having a conventional differential without the differential limiting mechanism. In the comparative example of FIGS. 7A to 7C, the brake LSD function was achieved to conduct vehicle attitude stabilizing control on the rear wheel side serving as a primary drive side, the primary drive side having a conventional differential without the differential limiting mechanism.

The tests were carried out on an upward slope with the left wheels of each test vehicle being on a wetted asphalt surface of the slope and the right wheels thereof being on a low friction surface of the slope.

FIGS. 4A to 5C show that the present invention can greatly increase the total torque of the rear left and right wheels on the secondary drive side and decrease braking energy on the same side compared with the comparative example.

FIGS. 6A to 7C show that the present invention can greatly increase the total torque of the rear left and right wheels on the primary drive side and decrease braking energy on the same side compared with the comparative example.

Figure 8:
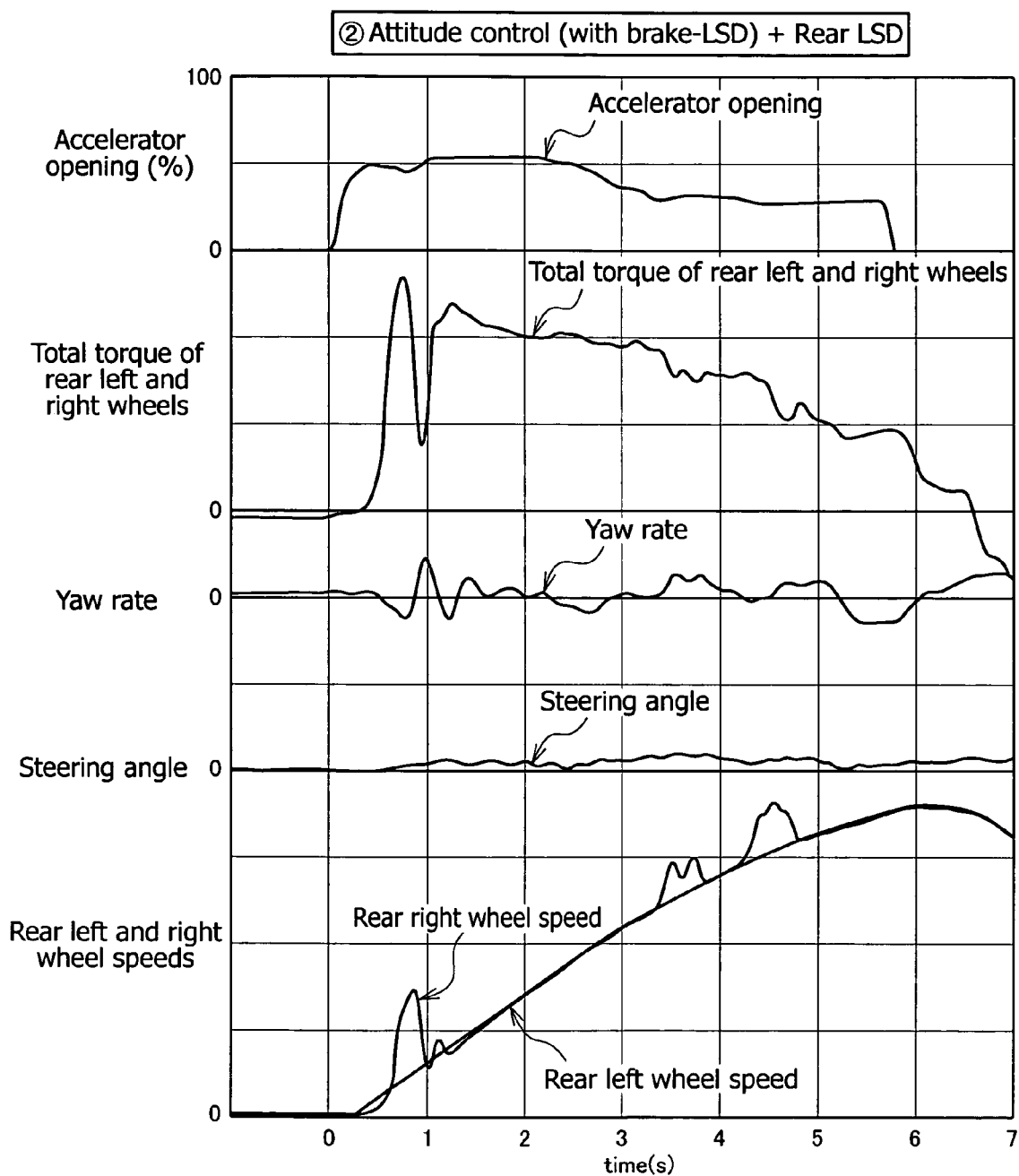
FIG. 8 is a graph showing results of a driving force control test carried out on a secondary drive side of an on-demand-type four-wheel-drive vehicle which is provided with the driving force control apparatus of the first embodiment, the graph showing temporal changes in the accelerator opening, total torque of rear left and right wheels, yaw rate, steering angle, and rear left and right wheel speeds of the vehicle.
Figure 9:
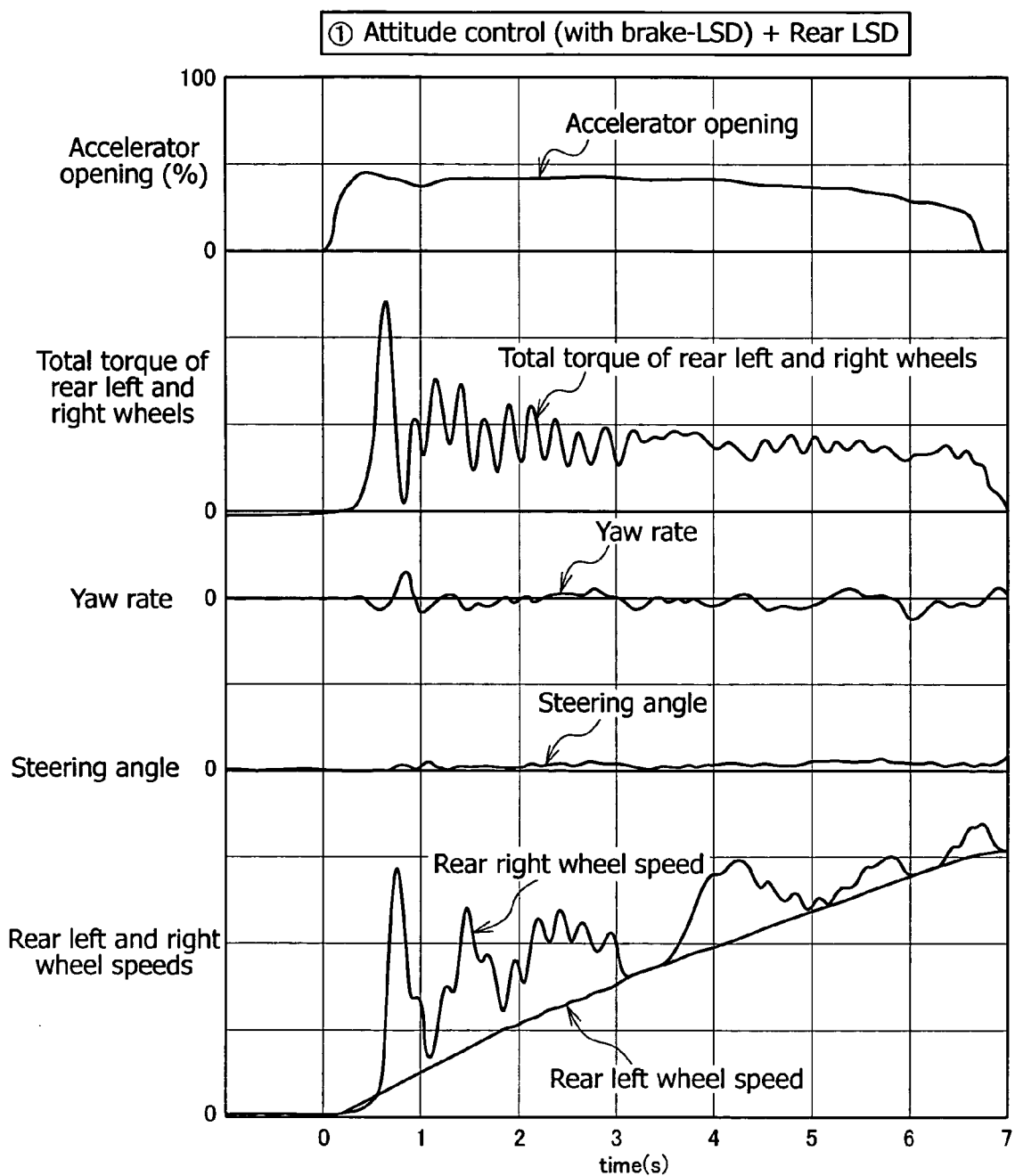
FIG. 9 is a graph showing results of a driving force control test carried out on a secondary drive side of an on-demand-type four-wheel-drive vehicle according to a comparative example, the graph showing temporal changes in the accelerator opening, total torque of rear left and right wheels, yaw rate, steering angle, and rear left and right wheel speeds of the vehicle.

FIGS. 8 and 9 show that the present invention employing the differential limiting mechanism having a large torque bias ratio can stabilize the running vehicle and realize high traction compared with the comparative example.

Each of the graphs of FIGS. 4A, 5A, 6A, and 7A shows temporal changes in the accelerator opening, rear left and right axle torque, and rear left and right wheel speeds of the test vehicle. Each of the graphs of FIGS. 4B, 5B, 6B, and 7B shows temporal changes in the rear brake heat generation of the vehicle. Each of the graphs of FIGS. 4C, 5C, 6C, and 7C shows temporal changes in the total torque of the rear left and right wheels of the vehicle. Each of the graphs of FIGS. 8 and 9 shows temporal changes in the accelerator opening, total torque of rear left and right wheels, yaw rate, steering angle, and rear left and right wheel speeds of the test vehicle.

Figure 4A:
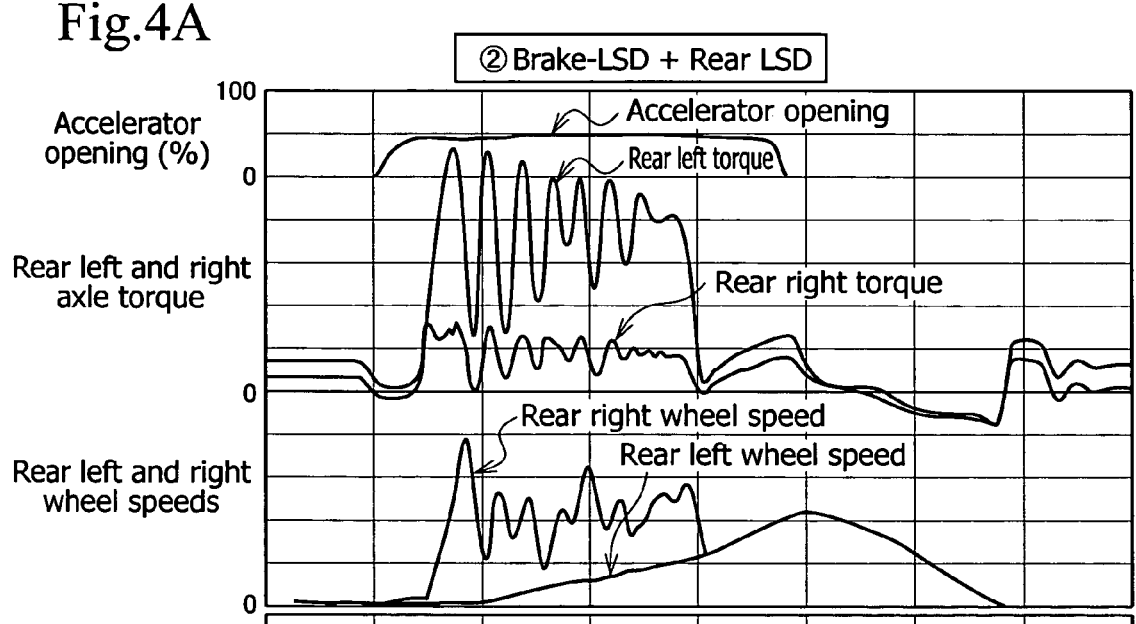
Figure 4B:
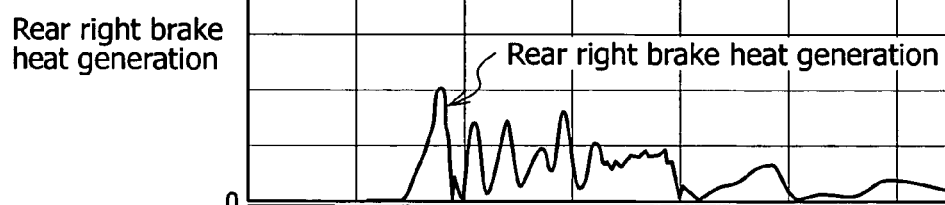
Figure 4C:
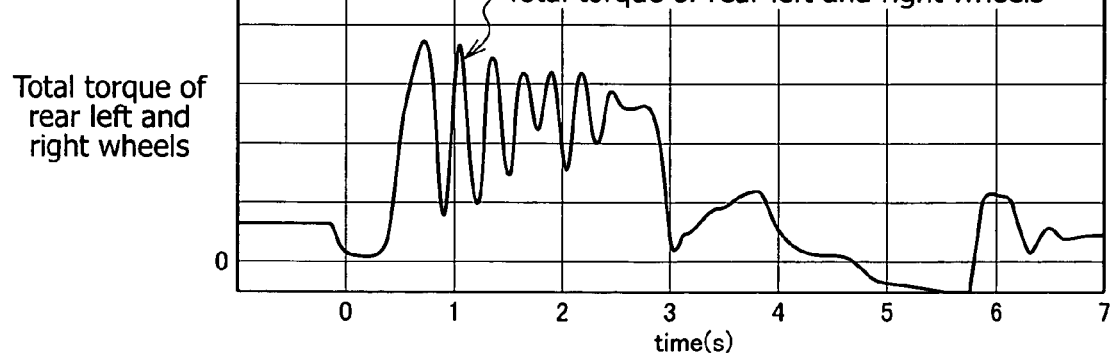
Figure 5A:
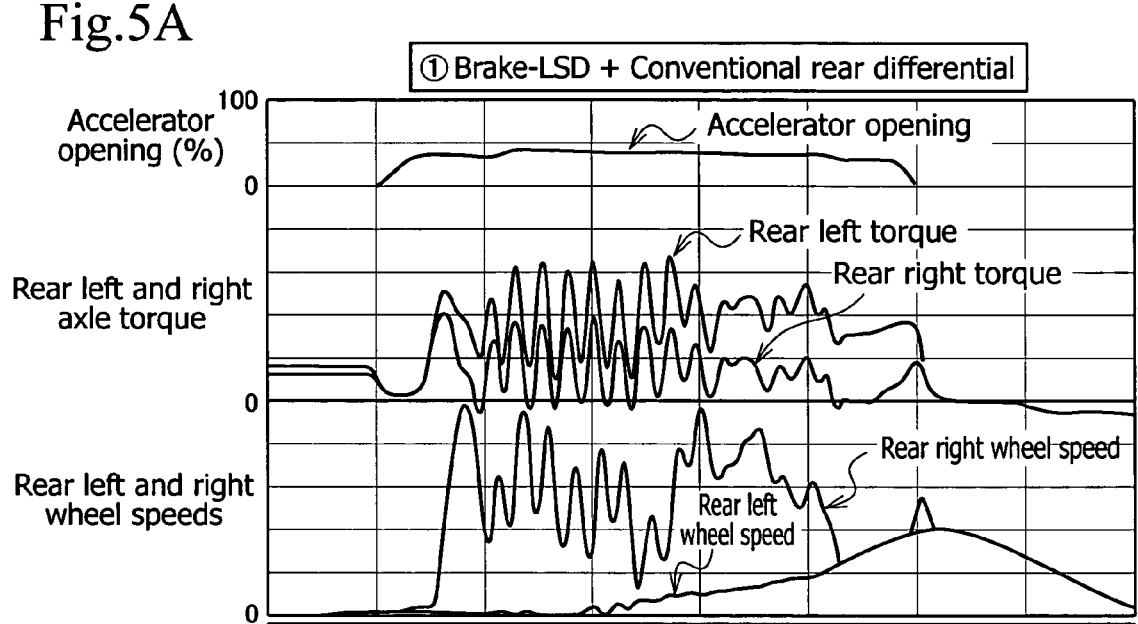
Figure 5B:
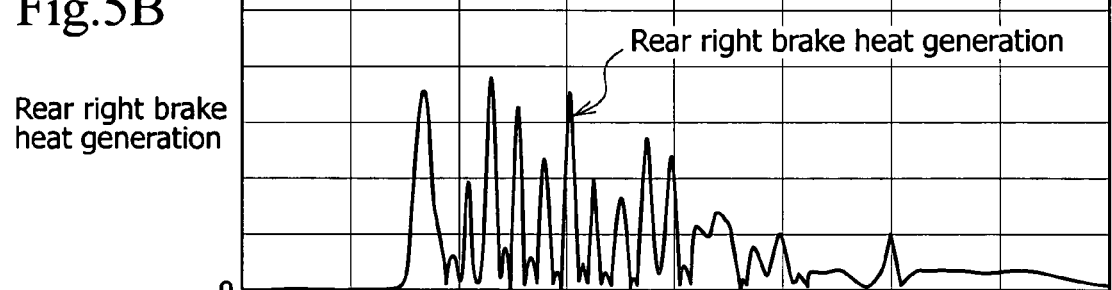
Figure 5C:
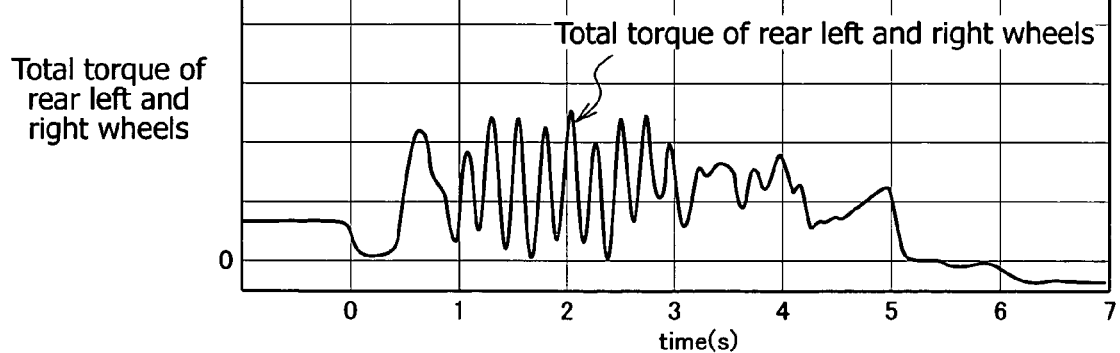
Figure 6A:
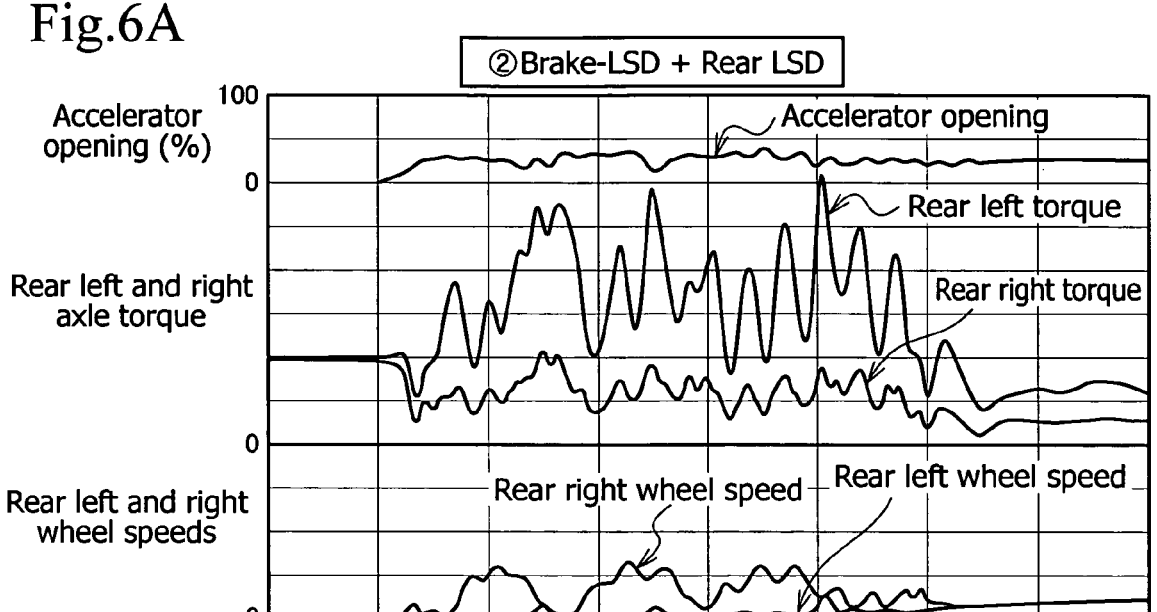
Figure 6B:
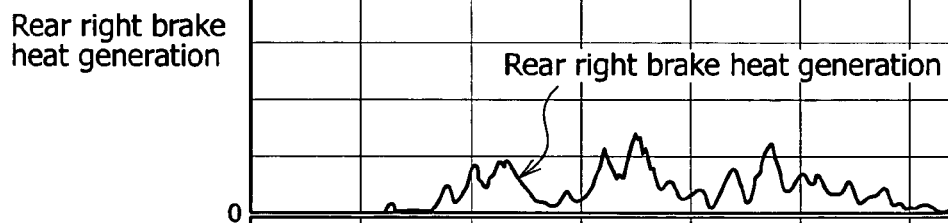
Figure 6C:
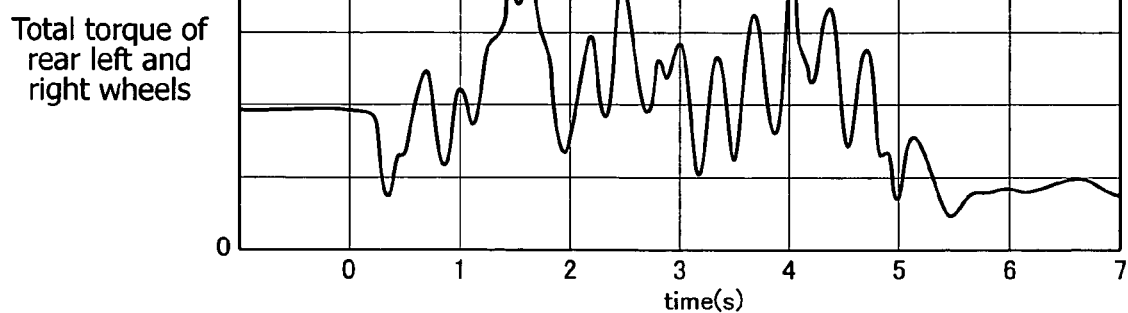

Compared with the comparative example of FIGS. 5A to 5C, the present invention of FIGS. 4A to 4C shows, substantially at the same accelerator opening, a greater increase in the torque of the rear left wheel that is not spinning as well as in the total torque of the rear wheels. Namely, the present invention of FIGS. 4A to 4C can speedily accelerate the vehicle, compared with the comparative example of FIGS. 5A to 5C. Compared with the comparative example of FIGS. 5A to 5C, the present invention of FIGS. 4A to 4C shows a smaller number of revolutions on the rear right wheel that is spinning and a quicker increase in the number of revolutions on the rear left wheel that is not spinning. Compared with the comparative example of FIGS. 5A to 5C, the present invention of FIGS. 4A to 4C shows a smaller heat quantity generated by the rear right brake.

Comparison between the test results of FIGS. 6A to 7C shows similar tendencies like the comparison between the tests results of FIGS. 4A to 5C.

Compared with the comparative example of FIG. 9, the present invention of FIG. 8 shows, substantially at the same accelerator opening, a greater increase in the total torque of the rear wheels and scarcely shows changes and stability in the yaw rate and steering angle. Compared with the comparative example of FIG. 9, the present invention of FIG. 8 shows a smaller number of revolutions on the rear right wheel that is spinning and a quicker increase in the number of revolutions on the rear left wheel that is not spinning. Namely, the present invention of FIG. 8 can speedily accelerate the vehicle, compared with the comparative example of FIG. 9.

Figure 10:
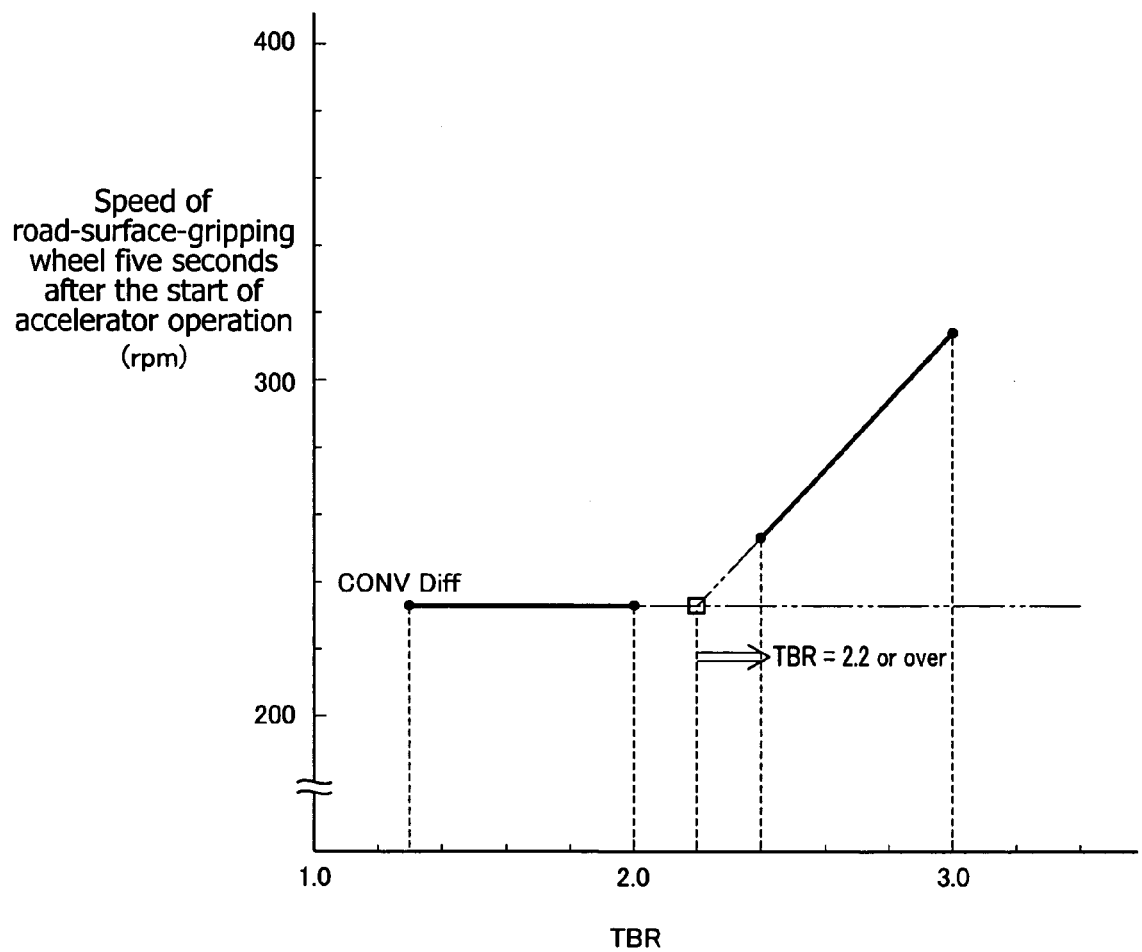
FIG. 10 is a graph showing a lower limit TBR according to the first embodiment of the present invention.

FIG. 10 is a graph showing results of tests related to a lower limit of the torque bias ratio (TBR). The tests were carried out on an upward slope with a vehicle having left wheels on a wetted asphalt surface of the slope and right wheels on a low friction surface of the slope. The graph of FIG. 10 represents a summary of test results shown in FIGS. 11 to 14. An abscissa of the graph represents the torque bias ratio and an ordinate thereof represents the number of revolutions of the rear left wheel 15, which is not spinning, five seconds after the accelerator is pushed down (in a state providing a detected signal from the accelerator sensor 79).

FIGS. 11 to 14 show results of driving force control tests carried out on the secondary drive side of an on-demand-type four-wheel-drive vehicle. Each graph of FIGS. 11 to 14 shows temporal changes in the accelerator opening, total torque of rear left and right wheels, yaw rate, steering angle, and rear left and right wheel speeds of the test vehicle. The test result of FIG. 11 relates to a vehicle equipped with a conventional rear differential. The test result of FIG. 12 relates to a vehicle equipped with a rear differential as an LSD whose torque bias ratio is set as Rt=2.0. The test result of FIG. 13 relates to a vehicle equipped with a rear differential as an LSD whose torque bias ratio is set as Rt=2.4. The test result of FIG. 14 relates to a vehicle equipped with a rear differential as an LSD whose torque bias ratio is set as Rt=3.0.

Figure 11:
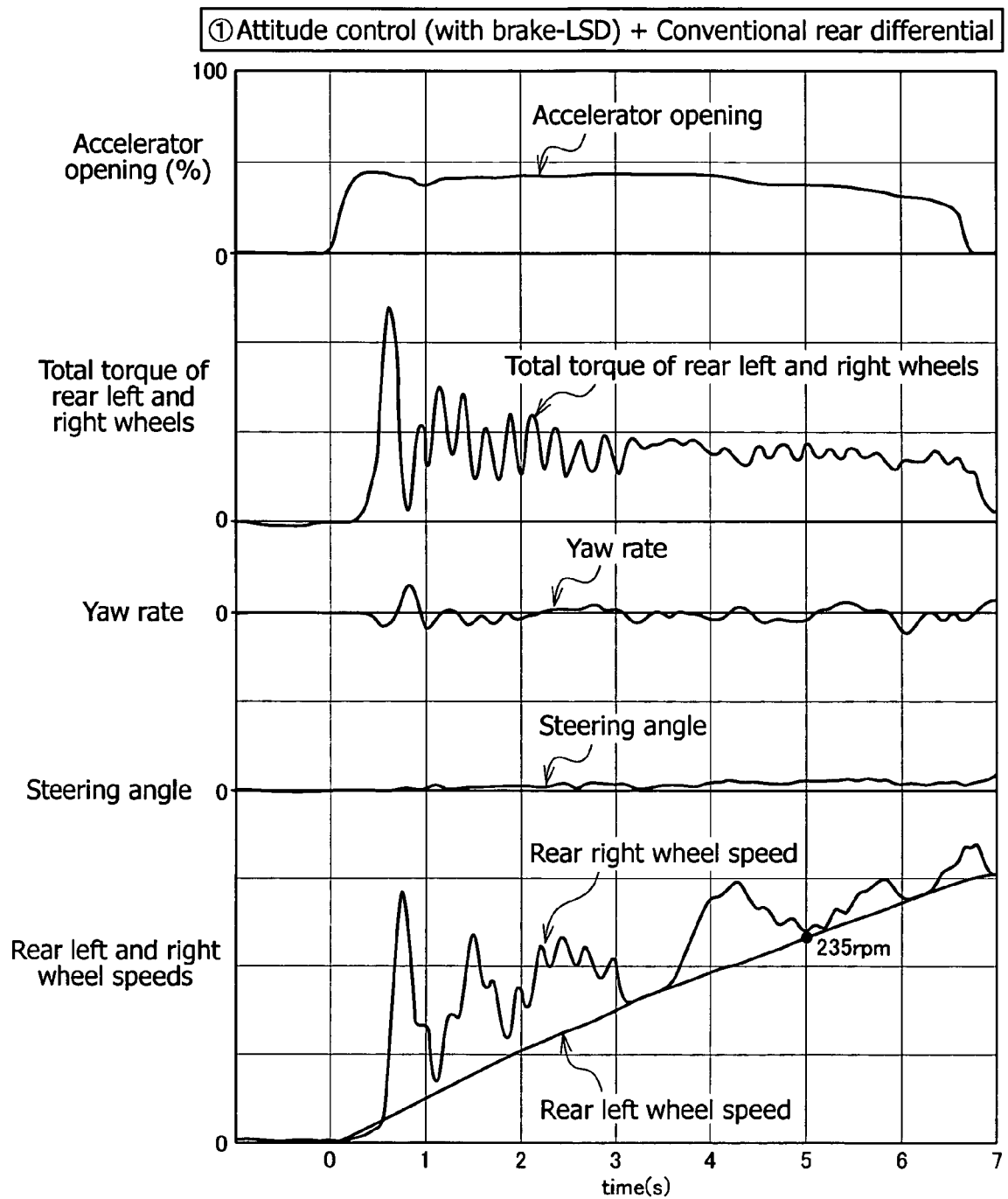
FIG. 11 is a graph showing results of a driving force control test carried out on a secondary drive side of an on-demandtype four-wheel-drive vehicle employing a conventional differential, the graph showing temporal changes in the accelerator opening, total torque of rear left and right wheels, yaw rate, steering angle, and rear left and right wheel speeds of the vehicle.
Figure 12:
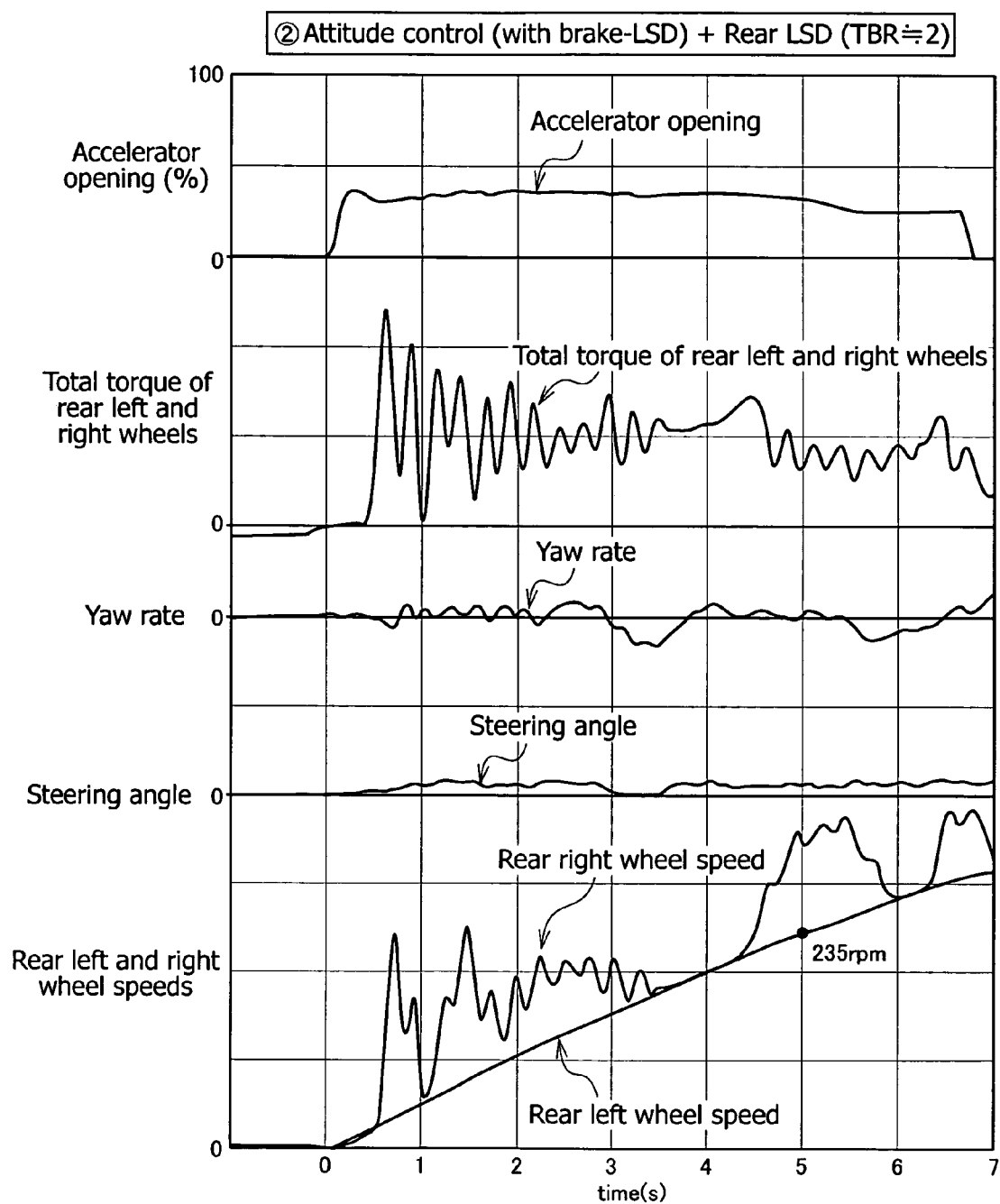
FIGS. 12 to 14 are graphs showing results of driving force control tests carried out with different torque bias ratios on a secondary drive side of an on-demand-type four-wheel-drive vehicle provided with the driving force control apparatus of the first embodiment, each graph showing temporal changes in the accelerator opening, total torque of rear left and right wheels, yaw rate, steering angle, and rear left and right wheel speeds of the vehicle.
Figure 13:
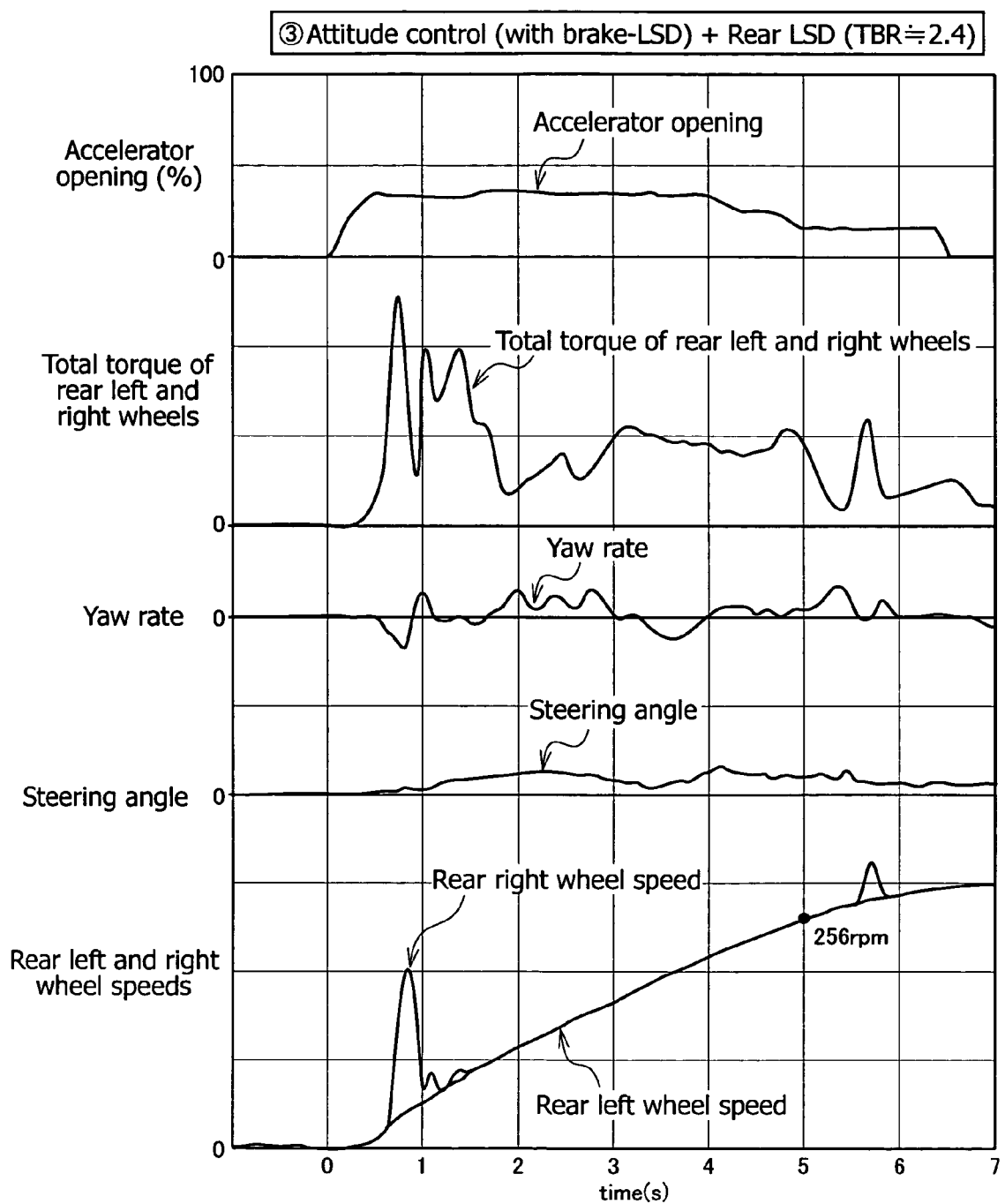
Figure 14:
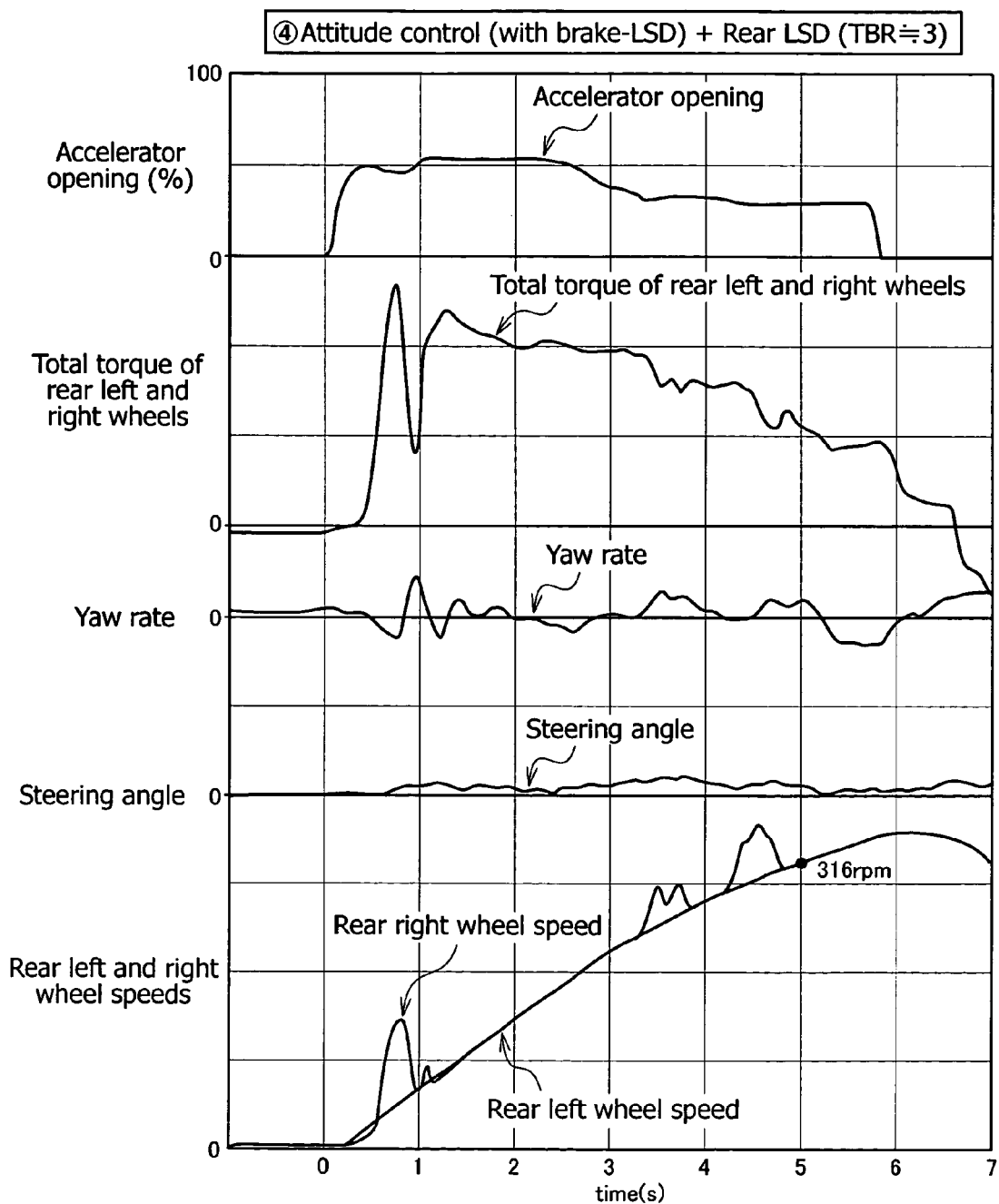

According to the conventional rear differential of FIG. 11, a five-seconds-later speed of the rear left (RL) wheel is 235 rpm. According to the rear differential with Rt=2.0 of FIG. 12, a five-seconds-later speed of the rear left wheel is 235 rpm. According to the rear differential with Rt=2.4 of FIG. 13, a five-seconds-later speed of the rear left wheel is 256 rpm. According to the rear differential with Rt=3.0 of FIG. 14, a five-seconds-later speed of the rear left wheel is 316 rpm.

The test results shown in FIGS. 11 to 14 have been plotted on the graph of FIG. 10. A segment connecting the test results of FIGS. 11 and 12 and a segment connecting the test results of FIGS. 13 and 14 intersect at a point of Rt=2.2.

It is confirmed from FIG. 10 that setting Rt=2.2 or over may quickly increase the revolution speed of the rear left wheel that is not spinning, speedily accelerate the vehicle, and stabilize the attitude of the vehicle.

A CSD (controlled slip differential) ECU 81 indicated with a dotted line in FIG. 1 is a control device that is used when the rear differential 3 is configured as an active-type LSD. According to the first embodiment, the rear differential 3 is configured as a passive-type LSD, as mentioned above. If the rear differential 3 is configured as an active-type LSD, the differential limiting mechanism provided for the rear differential 3 will employ a structure that uses an electromagnet to operate a cam which generates thrust to engage a multiplate clutch, or a structure that uses a hydraulic piston to engage a multiplate clutch, or a structure that uses an electric motor to operate a cam which generates thrust to engage a multiplate clutch. The CSD ECU 81 controls any one of the electromagnet, hydraulic piston, and electric motor and sets a torque bias ratio for the rear differential 3.

Similarly, the front differential on the primary drive side may be configured as an active-type LSD having a differential limiting mechanism that is similar to the above-mentioned one.

Second Embodiment

Figure 15:
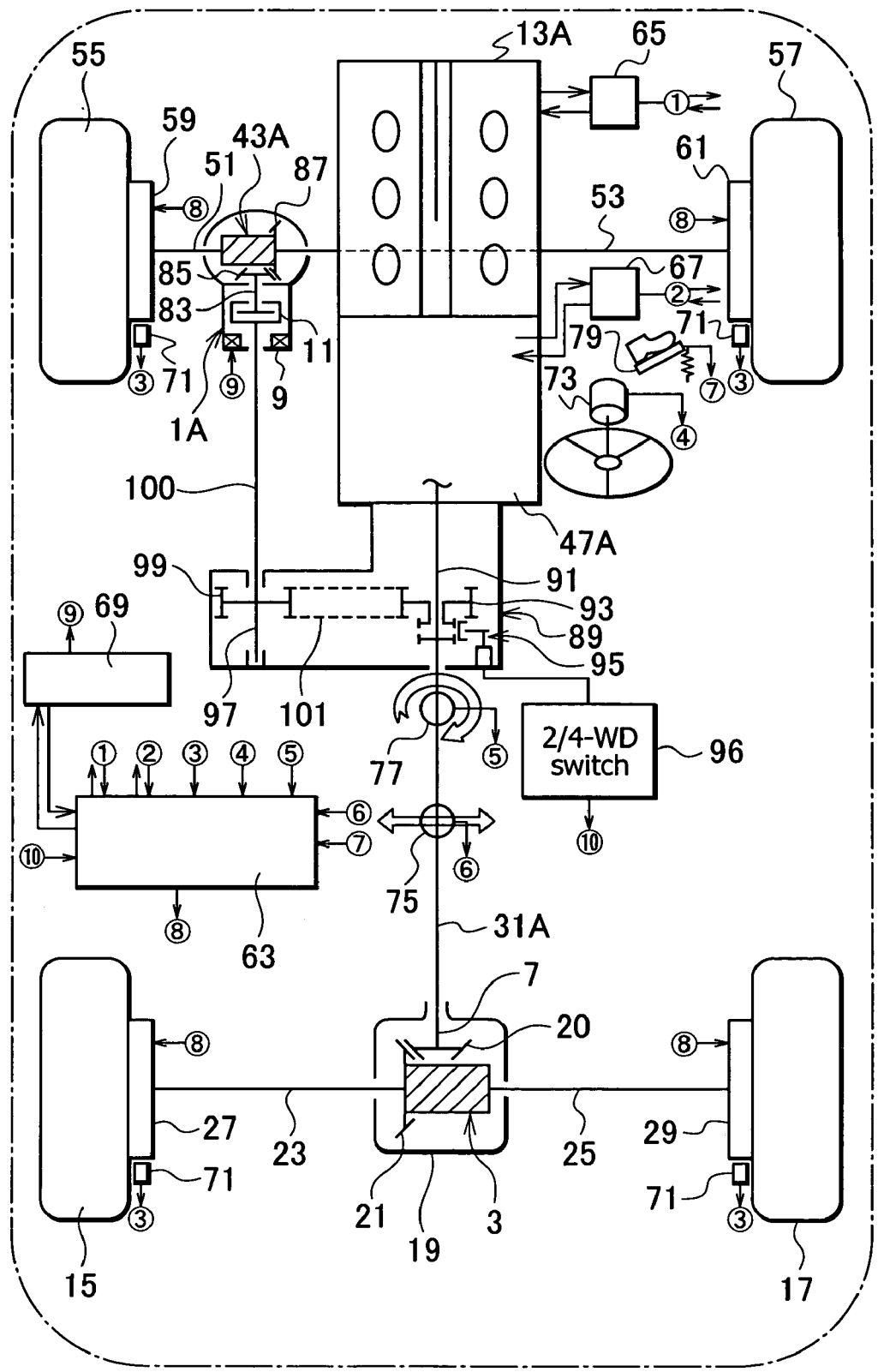
FIG. 15 is a plan view generally showing a four-wheel-drive vehicle having a driving force control apparatus according to a second embodiment of the present invention.

FIG. 15 is a plan view generally showing a four-wheel-drive vehicle having a driving force control apparatus according to a second embodiment of the present invention. In FIG. 15, the same or corresponding parts as those of FIG. 1 are represented with the same reference numerals or the same reference numerals plus "A."

The four-wheel-drive vehicle of FIG. 15 is a longitudinal front-engine, rear-drive (FR) vehicle. According to the second embodiment, a front wheel side serves as a secondary drive side, and therefore, a torque transmission coupling 1A is provided for a front differential 43A. The torque transmission coupling 1A is engaged with a drive pinion shaft 83 having a drive pinion gear 85. The drive pinion gear 85 meshes with a ring gear 87 of the front differential 43A, to form a final reduction mechanism. The front differential 43A on the secondary drive side and a rear differential 3 on a primary drive side each have a passive-type differential limiting mechanism. Like the first embodiment, the differential limiting mechanism may be of an active type.

Torque of an engine 13A is transmitted through a transmission 47A and a transfer 89 to a propeller shaft 31A.

The transfer 89 has a transmission shaft 91. An end of the transmission shaft 91 is connected to the transmission 47A and the other end thereof is connected through a universal joint to the propeller shaft 31A without other mechanisms.

The transmission shaft 91 supports a rotatable sprocket 93. The sprocket 93 is engaged with and disengaged from the transmission shaft 91 through a 2/4-WD switching mechanism 95. The 2/4-WD switching mechanism 95 operates to be switched by an actuator in response to a signal from a 2/4-WD switch 96 on an instrument panel.

The transmission shaft 91 is arranged in parallel with a transmission shaft 97 having another sprocket 99. Between the sprockets 99 and 93, a chain 101 is wounded. The transmission shaft 97 is connected through a universal joint to a propeller shaft 100.

Torque of the engine 13A is transmitted through the transmission 47A to the transfer 89. If the 2/4-WD switching mechanism 95 of the transfer 89 is in a 4-WD state due to an operation on the 2/4-WD switch 96, the torque is transferred from the transmission shaft 91 of the transfer 89 to the propeller shaft 31A for the rear wheels. At the same time, the torque is transferred through the sprocket 93, chain 101, and sprocket 99 to the propeller shaft 100 for the front wheels.

The propeller shaft 31A transmits the torque to the rear differential 3 from which the torque is transmitted through left and right axle shafts 23 and 25 to the rear left and right wheels 15 and 17.

From the propeller shaft 100, the torque is transmitted to the torque transmission coupling 1A. According to a torque transmission adjustment of the torque transmission coupling 1A, the torque is transmitted to the front differential 43A. From the front differential 43A, the torque is transmitted through left and right axle shafts 51 and 53 to the front left and right wheels 55 and 57.

As a result, the vehicle runs in a four-wheel-drive state in which the front wheels and rear wheels are driven.

If the 2/4-WD switching mechanism 95 of the transfer 89 is in a 2-WD state, the torque is transmitted from the transmission 47A only to the propeller shaft 31A for the rear wheels, so that the vehicle runs in a two-wheel-drive state in which the rear wheels 15 and 17 are driven.

According to the second embodiment, the front wheel side works as the secondary drive side and the rear wheel side as the primary drive side. An ABS/attitude ECU 63 explained in the first embodiment controls a hydraulic pressure control mechanism of disk brakes 27, 29, 59, and 61, to achieve the brake LSD function mentioned above. The brake LSD function increases torque according to a torque bias ratio set for the differential limiting mechanism, to secure sufficient total torque and shorten an ON-time of each disk brake. This results in suppressing the heating and wearing of the disk brakes.

According to the second embodiment, the front differential 43A on the secondary drive side may be of an active type. In this case, the CSD ECU 81 of FIG. 1 may be employed to adjust the torque bias ratio set for the front differential 43A. The torque bias ratio (TBR) Rt or transfer ratio for the rear differential 3 may be set as Rt=2.2 or over. If the rear right wheel is spinning without traction and the rear left wheel is not spinning, the setting of Rt=2.2 or over will speedily increase the revolution speed of the rear left wheel and quickly accelerate or stabilize the vehicle.

Third Embodiment

Figure 16:
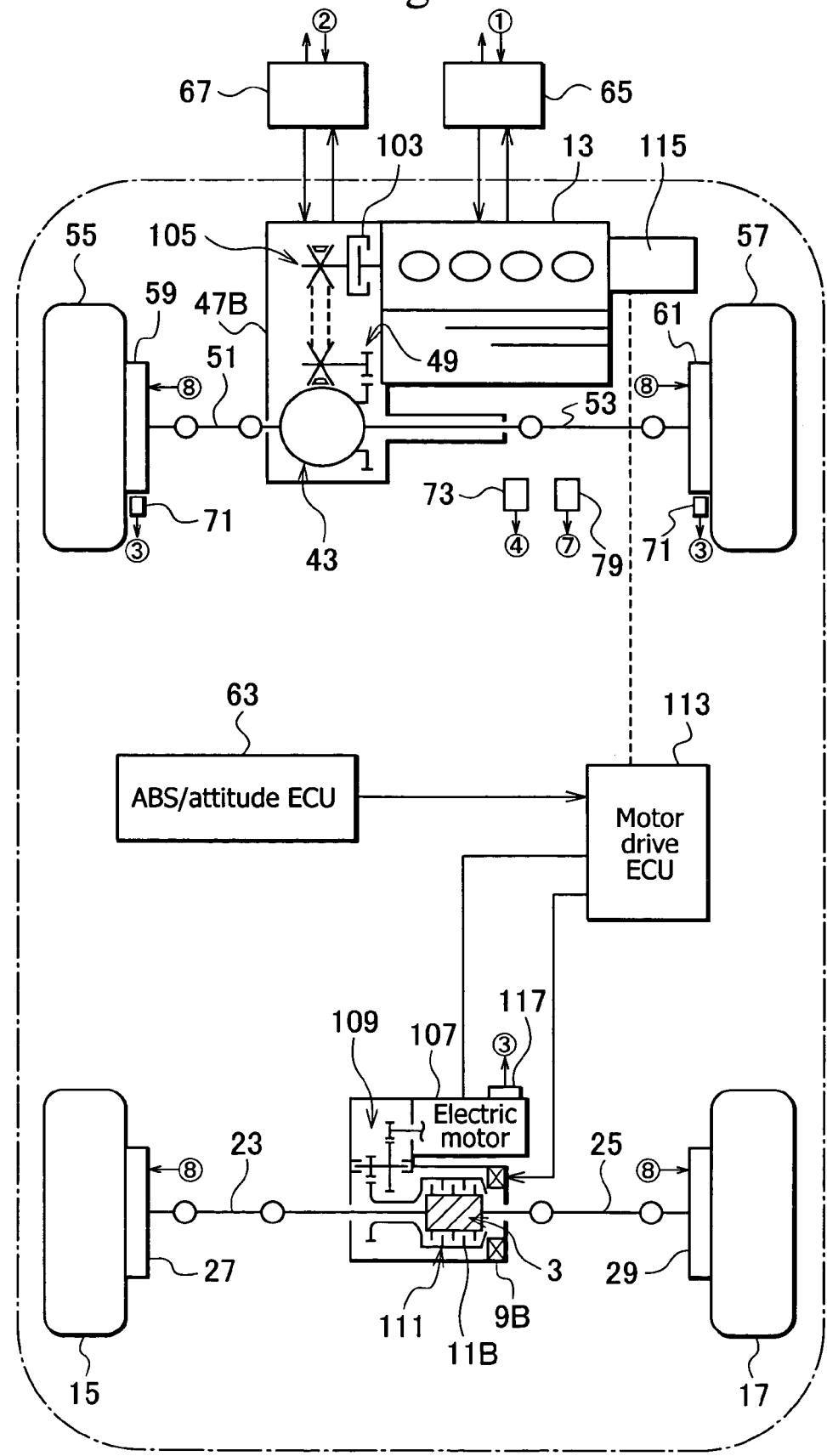
FIG. 16 is a plan view generally showing a four-wheel-drive vehicle having a driving force control apparatus according to a third embodiment of the present invention.

FIG. 16 is a plan view generally showing a four-wheel-drive vehicle having a driving force control apparatus according to a third embodiment of the present invention. In FIG. 16, the same or corresponding parts as those of FIG. 1 are represented with the same reference numerals or the same reference numerals plus "B."

The four-wheel-drive vehicle of FIG. 16 is a lateral front-engine, front-drive (FF) vehicle. The driving of the rear wheels is electrically assisted. A primary drive side is a front wheel side and a secondary drive side is a rear wheel side.

On the primary drive side (first drive side), torque of an engine (first drive source) 13 is transmitted through a main clutch 103 and a CVT (continuously variable transmission) 105 to a front differential 43.

On the secondary drive side (second drive side), torque of an electric motor (second drive source) 107 is transmitted through a reduction gear 109 and a torque connect/disconnect unit 111 to a rear differential 3. The torque connect/disconnect unit 111 may have the same structure as the torque transmission coupling 1 mentioned above and is composed of a multiplate clutch 11B and an electromagnet 9B.

The electric motor 107 and electromagnet 9B are connected to a motor drive ECU 113. The motor drive ECU 113 receives signals from an ABS/attitude ECU 63.

The electric motor 107 receives power from a motor generator 115 or a mere generator through the motor drive ECU 113. The motor generator 115 generates power for the electric motor 107 and serves as a motor to assist the engine 13.

The electric motor 107 has a motor speed sensor 117, which supplies a detected signal to the ABS/attitude ECU 63. The detected signal from the motor speed sensor 117 is used to compute wheel speeds of the rear wheels 15 and 17. Accordingly, the rear wheels 15 and 17 are not provided with wheel speed sensors.

In a normal run, the motor drive ECU 113 stops the electric motor 107 to transmit no torque to the rear wheels 15 and 17. The torque of the engine 13 is transmitted through a transmission 47B to the front differential 43. From the front differential 43, the torque is transmitted through left and right axle shafts 51 and 53 to front left and right wheels 55 and 57, to establish a two-wheel drive state.

At the start or acceleration of the vehicle, a large driving force is needed. In this case, the motor drive ECU 113 drives the electric motor 107 according to signals from the ABS/attitude ECU 63. The torque of the electric motor 107 is transmitted through the reduction gear 109 to the torque connect/disconnect unit 111.

If the electromagnet 9B of the torque connect/disconnect unit 111 is energized to put the torque connect/disconnect unit 111 in a connected state, the torque is transferred from the torque connect/disconnect unit 111 to the rear differential 3. From the rear differential 3, the torque is transmitted through left and right axle shafts 23 and 25 to the rear left and right wheels 15 and 17.

Accordingly, the assisting torque of the electric motor 107 is transmitted to the rear left and right wheels 15 and 17 that can differentially rotate. In this case, the vehicle runs in a four-wheel-drive state in which the front wheels 55 and 57 and rear wheels 15 and 17 are driven.

In the motor-assisted four-wheel-drive vehicle, the front wheel side serves as the primary drive side and the rear wheel side serves as the secondary drive side. The ABS/attitude ECU 63 controls a hydraulic pressure control mechanism of disk brakes 27, 29, 59, and 61, to achieve the brake LSD function mentioned above. The brake LSD function increases torque according to a torque bias ratio set for a differential limiting mechanism of the rear differential 3, to secure sufficient total torque and shorten an ON-time of each disk brake. This results in suppressing the heating and wearing of the disk brakes.

The ABS/attitude ECU 63 controls the disk brakes 27 and 29 according to the following condition:

$$TB \leq TEM \cdot i/(Rt+1)$$

where "i" is a reduction ratio achieved by the reduction gear 109, "Rt" is a torque bias ratio set for the rear differential 3, "TB" is the braking torque of the disk brakes 27 and 29, and "TEM" is the transmission torque of the torque connect/disconnect unit 111.

This control can prevent from increasing the braking torque in excess, also minimize the braking torque, and suppress the heating and wearing of the disk brakes.

Setting Rt=2.2 or over may quickly increase the revolution speed of a rear wheel that is not spinning, speedily accelerate the vehicle, and stabilize the attitude of the vehicle.

According to the third embodiment, the rear and front differentials are driven by separate drive sources. Each differential is provided with the differential limiting mechanism. According to signals from the electric control units (ECUs), the brake LSD function, which involves the attitude stabilizing control or is separate, properly and quickly transfers the torque of each drive source to the corresponding left and right wheels.

In each embodiment, the differential on the secondary drive side may be of an active type, or the differential on the primary drive side may be of an active type, or the differential on any one of the primary and secondary drive sides may be replaced with a conventional differential.

Although the brake LSD function in each embodiment is achieved between left and right wheels, it is possible to employ a center differential which is provided with a differential limiting mechanism and achieve a brake LSD function between front and rear wheels.

The present invention is applicable not only to four-wheel-drive vehicles but also to two-wheel-drive vehicles.

What is claimed is:

1. An apparatus for controlling the driving force of a vehicle, comprising:
   drive wheels configured to receive torque from a drive source;
   a differential mechanism arranged between the drive source and the drive wheels, configured to allow differential rotation between the drive wheels and transmit torque from the drive source to the drive wheels;
   brakes, each one of said brakes corresponding to one of the drive wheels, and configured to selectively provide a braking force to the corresponding one of the drive wheels;
   a driving force controller configured to control at least one of the brakes and limit differential rotation between the drive wheels;
   a differential limiting mechanism provided for the differential mechanism; and
   a torque transmission coupling, wherein
   the differential mechanism receives torque from the drive source through the torque transmission coupling, and the driving force controller controls the brakes according to the following condition:

$$TB \leq TEM \cdot i/(Rt+1)$$

where "i" is a final reduction ratio between the torque connect/disconnect mechanism and one of the front and rear differential mechanisms on the secondary drive side, "Rt" is a torque bias ratio set for the differential mechanism on the secondary drive side, "TB" is braking torque achieved by the brakes, and "TEM" is torque transmitted through the torque transmission coupling.

2. The apparatus of claim 1, wherein:
   the driving force controller controls a dynamic attitude including a yaw rate of the vehicle.

3. An apparatus for controlling the driving force of a vehicle, comprising:
   front and rear left and right drive wheels configured to receive torque from a drive source;
   a front differential mechanism arranged between the drive source and the front left and right drive wheels;
   a rear differential mechanism arranged between the drive source and the rear left and right drive wheels;
   brakes, each one of said brakes corresponding to one of the front and rear left and right drive wheels, and configured to selectively provide a braking force to the corresponding one of the front and rear left and right drive wheels;
   a driving force controller configured to control the brakes and limit differential rotation among the drive wheels;
   a differential limiting mechanism provided for the differential mechanism; and
   a torque connect/disconnect mechanism, wherein
   one of the front and rear differential mechanisms is on a primary drive side that directly receives torque from the drive source, and the other is on a secondary drive side that receives torque from the drive source through the torque connect/disconnect mechanism;
   the differential limiting mechanism is arranged on the secondary drive side; and
   the driving force controller controls the brakes according to the following condition:

$$TB \leq TEM \cdot i/(Rt+1)$$

where "i" is a final reduction ratio between the torque connect/disconnect mechanism and one of the front and rear differential mechanisms on the secondary drive side, "Rt" is a torque bias ratio set for the differential mechanism on the secondary drive side, "TB" is braking torque achieved by the brakes, and "TEM" is torque transmitted through the torque connect/disconnect mechanism.

4. The apparatus of claim 3, wherein:
   the differential limiting mechanism sets a torque bias ratio of 2.2 or over for the differential mechanism.

5. The apparatus of claim 3, wherein:
   the drive source comprises at least first and second drive sources;
   one of the front and rear differential mechanisms is on a first drive side that receives torque from the first drive source and the other is on a second drive side that receives torque from the second drive source; and
   the differential limiting mechanism is arranged on one of the first and second drive sides.

* * * * *